United States Patent
Wang et al.

(10) Patent No.: US 12,150,229 B2
(45) Date of Patent: *Nov. 19, 2024

(54) HEATING DEVICE

(71) Applicants: HAIER SMART HOME CO., LTD., Shandong (CN); QINGDAO HAIER SPECIAL REFRIGERATION ELECTRIC APPLIANCE CO., LTD., Shandong (CN)

(72) Inventors: Haijuan Wang, Qingdao (CN); Kunkun Zhao, Qingdao (CN); Sen Mu, Qingdao (CN); Dongqiang Cao, Qingdao (CN)

(73) Assignees: HAIER SMART HOME CO., LTD., Shandong (CN); QINGDAO HAIER SPECIAL REFRIGERATION ELECTRIC APPLIANCE CO., LTD., Shandong (CN)

( * ) Notice: Subject to any disclaimer, the term of this patent is extended or adjusted under 35 U.S.C. 154(b) by 726 days.

This patent is subject to a terminal disclaimer.

(21) Appl. No.: 17/420,497

(22) PCT Filed: Dec. 11, 2019

(86) PCT No.: PCT/CN2019/124656
§ 371 (c)(1),
(2) Date: Jul. 2, 2021

(87) PCT Pub. No.: WO2020/140711
PCT Pub. Date: Jul. 9, 2020

(65) Prior Publication Data
US 2022/0104318 A1 Mar. 31, 2022

(30) Foreign Application Priority Data
Jan. 4, 2019 (CN) .......................... 201920013904.6

(51) Int. Cl.
*A23L 3/00* (2006.01)
*A23L 3/01* (2006.01)
(Continued)

(52) U.S. Cl.
CPC .............. *H05B 6/688* (2013.01); *A23L 3/001* (2013.01); *A23L 3/01* (2013.01); *A23L 3/365* (2013.01);
(Continued)

(58) Field of Classification Search
CPC ...... H05B 6/688; H05B 6/6402; H05B 6/701; H05B 6/707; H05B 6/725; A23L 3/001; A23L 3/01; A23L 3/365
See application file for complete search history.

(56) References Cited

U.S. PATENT DOCUMENTS 6,913,011 B1 7/2005 Snider
2010/0282742 A1* 11/2010 Uchiyama ............ H05B 6/6402
219/702
(Continued)

FOREIGN PATENT DOCUMENTS

CN 2847095 Y 12/2006
CN 101910731 A 12/2010
(Continued)

OTHER PUBLICATIONS

International Search Report for PCT/CN2019/124656 (ISA/CN) mailed Mar. 12, 2020 (6 pages).
(Continued)

*Primary Examiner* — Brian W Jennison
(74) *Attorney, Agent, or Firm* — ALSTON & BIRD LLP

(57) ABSTRACT

Disclosed is a heating device (100), including: a metal cylinder body (110) provided with a pick-and-place opening, a door body (120) configured to open and close the pick-
(Continued)

and-place opening, an electromagnetic generating module (161) configured to generate an electromagnetic wave signal, and a radiating antenna (150). The radiating antenna (150) is configured to be electrically connected with the electromagnetic generating module (161) to generate electromagnetic waves of a corresponding frequency according to the electromagnetic wave signal. The heating device (100) further includes an antenna housing (130) made of an insulating material. The antenna housing (130) is configured to separate an inner space of the cylinder body (110) into a heating chamber (111) and an electrical appliance chamber (112), wherein an object to be processed and the radiating antenna (150) are respectively disposed in the heating chamber (111) and the electrical appliance chamber (112), and the radiating antenna (150) is configured to be fixedly connected with the antenna housing (130). The heating device (100) covers and fixes the radiating antenna (150) through the antenna housing (130), which not only can separate the object to be processed from the radiating antenna (150) to prevent the radiating antenna (150) from being dirty or damaged by accidental touch, but also can simplify the assembly process of the heating device (100) to facilitate the positioning and installation of the radiating antenna (150).

10 Claims, 5 Drawing Sheets

(51) Int. Cl.
  *A23L 3/365*  (2006.01)
  *H05B 6/64*  (2006.01)
  *H05B 6/68*  (2006.01)
  *H05B 6/72*  (2006.01)

(52) U.S. Cl.
  CPC ............. *H05B 6/6402* (2013.01); *H05B 6/72* (2013.01); *A23V 2002/00* (2013.01)

(56) References Cited

U.S. PATENT DOCUMENTS

| | | | | |
|---|---|---|---|---|
| 2011/0198344 | A1* | 8/2011 | Uchiyama | H05B 6/647 |
| | | | | 219/680 |
| 2015/0045785 | A1* | 2/2015 | Beale | B05D 5/00 |
| | | | | 216/13 |

FOREIGN PATENT DOCUMENTS

| | | |
|---|---|---|
| CN | 108916926 A | 11/2018 |
| CN | 109068432 A | 12/2018 |
| JP | S59-18366 A | 1/1984 |
| JP | S61-91482 A | 5/1986 |
| WO | WO-1986/02143 A1 | 4/1986 |

OTHER PUBLICATIONS

1$^{st}$ Office Action for Australia Patent Application No. 2019418922 dated May 5, 2022 (3 pages).
1$^{st}$ Office Action for EP Application No. 19907787.6 dated Feb. 7, 2022 (6 pages).
1$^{st}$ Office Action for Russia Patent Application No. 2021122553 dated Mar. 28, 2022 w/English translation (6 pages).
Supplementary European Search Report for EP Application No. 19907787.6 dated Jan. 26, 2022 (4 pages).
Search Report for Russia Patent Application No. 2021122553 dated Mar. 28, 2022 w/English translation (4 pages).
1$^{st}$ Office Action for India Patent Application No. 202137030698 dated Sep. 6, 2022 (5 pages).
Notice of Acceptance for Australia Patent Application No. 2019418922 dated Aug. 29, 2022 (3 pages).
Intention to Grant EP Patent Application No. 19907787.6 dated Jun. 30, 2022 (24 pages).
Decision to Grant Russia Patent Application No. 2021122553 dated Aug. 5, 2022 (13 pages).

\* cited by examiner

HEATING DEVICE

TECHNICAL FIELD

The present invention relates to kitchen appliances, and particularly relates to an electromagnetic wave heating device.

BACKGROUND ART

In the freezing process of food, the quality of the food is maintained, but the frozen food needs to be thawed before processing or eating. In order to facilitate users freezing and thawing the food, in the prior art, the food is generally thawed by an electromagnetic wave device.

However, not only the dielectric coefficients of foods with different attributes are different, but the dielectric coefficients of foods with the same attributes will also change as the temperature changes during the thawing process, so that the absorption rate of electromagnetic waves by the foods fluctuates up and down. By comprehensive consideration, a heating device with simple assembly and high heating efficiency is required in design.

SUMMARY OF THE INVENTION

An objective of the present invention is to provide a heating device with simple assembly.

A further objective of the present invention is to improve the heating efficiency.

Specifically, the present invention provides a heating device, including:
- a metal cylinder body, provided with a pick-and-place opening;
- a door body, disposed at the pick-and-place opening and configured to open and close the pick-and-place opening;
- an electromagnetic generating module, configured to generate an electromagnetic wave signal; and
- a radiating antenna, configured to be electrically connected with the electromagnetic generating module to generate electromagnetic waves of a corresponding frequency according to the electromagnetic wave signal, wherein the heating device further includes:
- an antenna housing, made of an insulating material and configured to separate an inner space of the cylinder body into a heating chamber and an electrical appliance chamber, wherein an object to be processed and the radiating antenna are respectively disposed in the heating chamber and the electrical appliance chamber; and
- the radiating antenna is configured to be fixedly connected with the antenna housing.

Optionally, the antenna housing includes:
- a clapboard, configured to separate the heating chamber and the electrical appliance chamber; and
- a skirt part, configured to be fixedly connected with an inner wall of the cylinder body.

Optionally, the antenna housing is disposed at a bottom of the cylinder body, and the radiating antenna is horizontally fixed on a lower surface of the clapboard.

Optionally, the radiating antenna is disposed at a height of ⅓ to ½ of the cylinder body.

Optionally, the heating device further includes:
- a signal processing and measurement and control circuit, disposed in the electrical appliance chamber and located on a rear side of the radiating antenna, including:
- a detection unit, connected in series between the electromagnetic generating module and the radiating antenna, and configured to detect specific parameters of an incident wave signal and a reflected wave signal passing through the detection unit;
- a control unit, configured to calculate an electromagnetic wave absorption rate of the object to be processed according to the specific parameters; and
- a matching unit, connected in series between the electromagnetic generating module and the radiating antenna, and configured to adjust a load impedance of the electromagnetic generating module according to the electromagnetic wave absorption rate.

Optionally, the signal processing and measurement and control circuit is integrated on a circuit board, and the circuit board is horizontally disposed.

Optionally, the radiating antenna is configured to be engaged with the antenna housing.

Optionally, the radiating antenna is provided with a plurality of engaging holes; and
- the antenna housing is correspondingly provided with a plurality of buckles, and the plurality of buckles are configured to respectively pass through the plurality of engaging holes to be engaged with the radiating antenna, wherein
- each of the buckles is composed of two barbs disposed at an interval and in mirror symmetry; or
- each of the buckles is composed of a fixing part perpendicular to the radiating antenna and having a hollow middle part, and an elastic part extending inclining to the fixing part from an inner end edge of the fixing part and toward the radiating antenna.

Optionally, the radiating antenna is configured to be fixed to the antenna housing by an electroplating process.

Optionally, the antenna housing is made of a non-transparent material.

In the heating device of the present invention, the radiating antenna is covered and fixed through the antenna housing, which not only can separate the object to be processed from the radiating antenna to prevent the radiating antenna from being dirty or damaged by accidental touch, but also can simplify the assembly process of the heating device to facilitate the positioning and installation of the radiating antenna.

Further, in the present invention, the antenna housing is disposed at the height of ⅓ to ½ of the cylinder body, which not only can avoid the damage to the antenna housing and the radiating antenna due to the fact that a user places an object to be processed with excessive height, but also can make the electromagnetic waves in the heating chamber have a relatively high energy density, so that the object to be processed is quickly heated.

Further, in the present invention, the load impedance of the electromagnetic generating module is adjusted by the matching unit so as to improve the matching degree between the output impedance and the load impedance of the electromagnetic generating module, so that when foods with different fixed attributes (such as type, weight and volume) are placed in the heating chamber, or during the temperature change of the foods, relatively more electromagnetic wave energy is radiated in the heating chamber.

According to the following detailed description of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention will be described in detail below with reference to the drawings by way of example and not limitation. The same reference numerals in the drawings indicate the same or similar components or parts. Those skilled in the art should understand that these drawings are not necessarily drawn in scale. In figures.

DETAILED DESCRIPTION OF THE INVENTION

Figure 1:
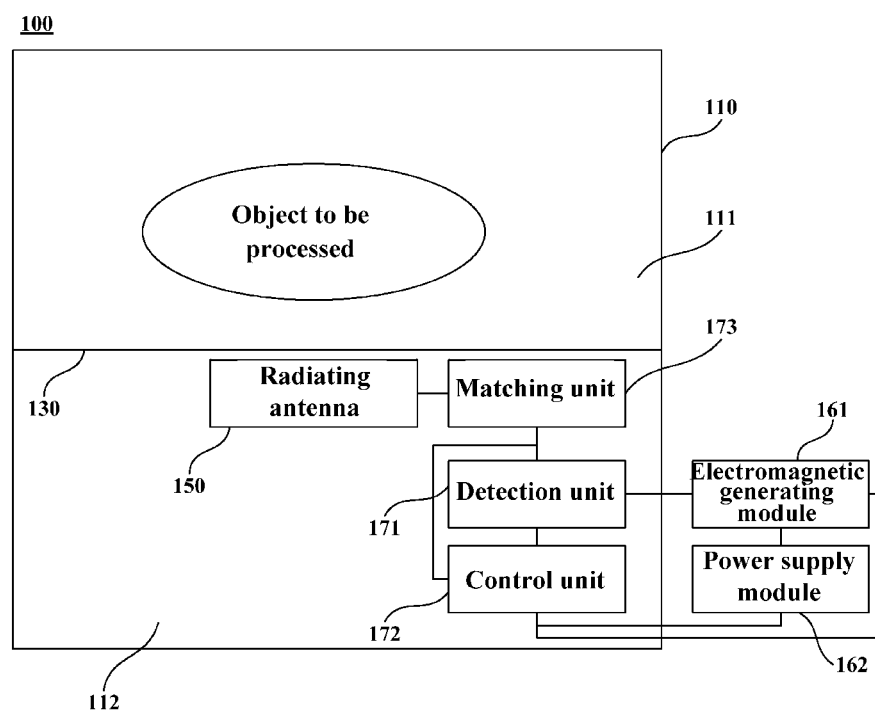
FIG. 1 is a schematic structural view of a heating device according to one embodiment of the present invention.
Figure 2:
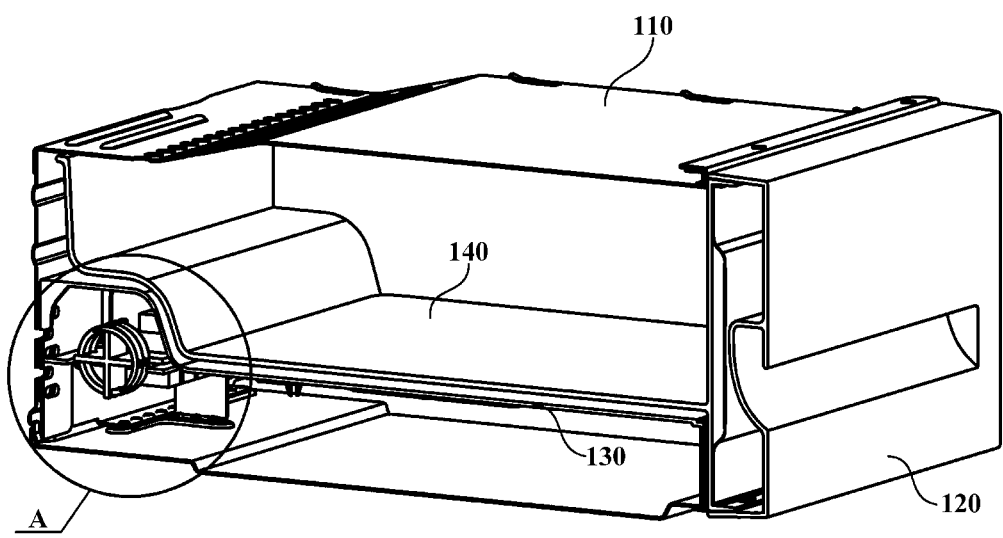
FIG. 2 is a schematic cross-sectional view of the heating device as shown in FIG. 1, wherein an electromagnetic generating module and a power supply module are omitted.

FIG. 1 is a schematic structural view of a heating device 100 according to one embodiment of the present invention. FIG. 2 is a schematic cross-sectional view of the heating device 100 as shown in FIG. 1, wherein an electromagnetic generating module 161 and a power supply module 162 are omitted. Referring to FIG. 1 and FIG. 2, the heating device 100 may include a cylinder body 110, a door body 120, an electromagnetic generating module 161, a power supply module 162 and a radiating antenna 150.

The cylinder body 110 may be configured to place an object to be processed, and a front wall or a top wall of the cylinder body may be provided with a pick-and-place opening for picking and placing the object to be processed.

The door body 120 may be installed together with the cylinder body 110 by an appropriate method, such as a sliding rail connection, a hinged connection, etc., and is configured to open and close the pick-and-place opening. In an illustrated embodiment, the heating device 100 also includes a drawer 140 for carrying the object to be processed; a front end plate of the drawer 140 is configured to be fixedly connected with the door body 120, and two lateral side plates of the drawer are movably connected with the cylinder body 110 by sliding rails.

In some embodiments, the cylinder body 110 and the door body 120 may be respectively provided with electromagnetic shielding features, so that the door body 120 is conductively connected with the cylinder body 110 when the door body is in a closed state, so as to prevent electromagnetic leakage.

The power supply module 162 may be configured to be electrically connected with the electromagnetic generating module 161 to provide electric energy to the electromagnetic generating module 161, so that the electromagnetic generating module 161 generates electromagnetic wave signals.

The radiating antenna 150 may be disposed in the cylinder body 110 and is electrically connected with the electromagnetic generating module 161 to generate electromagnetic waves of corresponding frequencies according to the electromagnetic wave signals, so as to heat the object to be processed in the cylinder body 110.

In some embodiments, the cylinder body 110 may be made of metals to serve as a receiving pole to receive electromagnetic waves generated by the radiating antenna 150. In some other embodiments, a receiving pole plate may be disposed on the top wall of the cylinder body 110 to receive electromagnetic waves generated by the radiating antenna 150.

Figure 4:
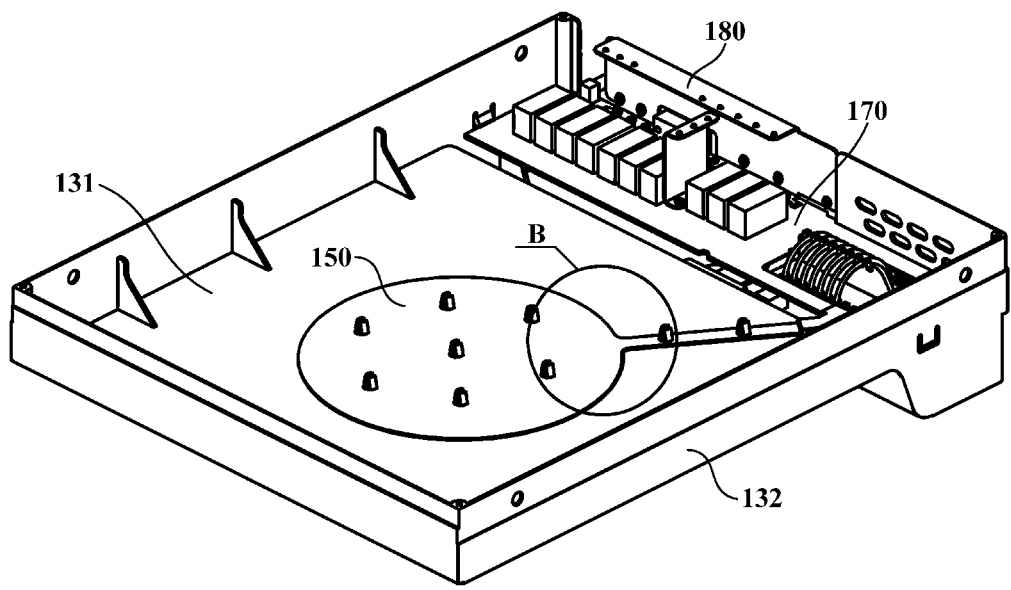
FIG. 4 is a schematic structural view of an electrical appliance chamber according to one embodiment of the present invention.
Figure 6:
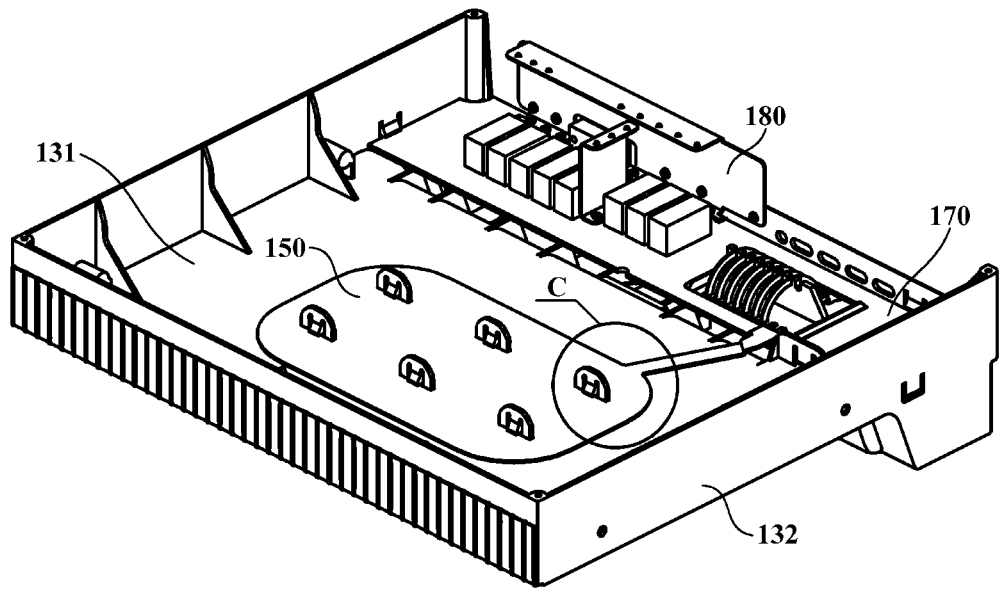
FIG. 6 is a schematic structural view of an electrical appliance chamber according to another embodiment of the present invention.

FIG. 4 is a schematic structural view of an electrical appliance chamber 112 according to one embodiment of the present invention. FIG. 6 is a schematic structural view of the electrical appliance chamber 112 according to another embodiment of the present invention. Referring to FIG. 4 and FIG. 6, the peripheral edge of the radiating antenna 150 may be formed by smooth curves, so as to make the distribution of electromagnetic waves in the cylinder body 110 more uniform, thereby improving the temperature uniformity of the object to be processed. A smooth curve refers to a curve of which the first derivative of the curve equation is continuous, which means that the peripheral edge of the radiating antenna 150 has no sharp corner in engineering.

Referring to FIG. 2 and FIG. 4, the heating device 100 may further include an antenna housing 130 to separate the inner space of the cylinder body 110 into a heating chamber 111 and an electrical appliance chamber 112. The object to be processed and the radiating antenna 150 may be respectively disposed in the heating chamber 111 and the electrical appliance chamber 112 to separate the object to be processed from the radiating antenna 150, so as to prevent the radiating antenna 150 from being dirty or damaged by accidental touch.

In some embodiments, the antenna housing 130 may be made of an insulating material, so that the electromagnetic waves generated by the radiating antenna 150 may pass through the antenna housing 130 to heat the object to be processed. Further, the antenna housing 130 may be made of a non-transparent material to reduce the electromagnetic loss of the electromagnetic waves at the antenna housing 130, thereby increasing the heating rate of the object to be processed. The above-mentioned non-transparent material is a translucent material or an opaque material. The non-transparent material may be a PP material, a PC material or an ABS material.

The antenna housing 130 may also be configured to fix the radiating antenna 150 to simplify the assembly process of the heating device 100 and facilitate the positioning and installation of the radiating antenna 150. Specifically, the antenna housing 130 may include a clapboard 131 for separating the heating chamber 111 and the electrical appliance chamber 112, and a skirt part 132 fixedly connected with the inner wall of the cylinder body 110, wherein the radiating antenna 150 may be configured to be fixedly connected with the clapboard 131.

Figure 5:
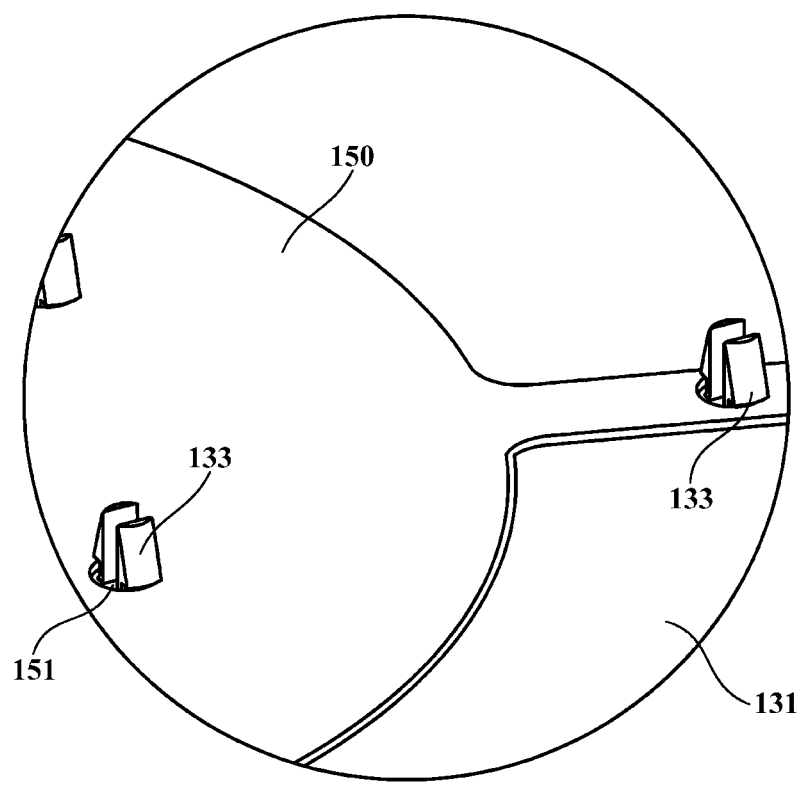
FIG. 5 is a schematic enlarged view of a region B in FIG. 4.

In some embodiments, the radiating antenna 150 may be configured to be engaged with the antenna housing 130. FIG. 5 is a schematic enlarged view of a region B in FIG. 4. Referring to FIG. 5, the radiating antenna 150 may be provided with a plurality of engaging holes 151; the antenna housing 130 may be correspondingly provided with a plurality of buckles 133; and the plurality of buckles 133 are configured to respectively pass through the plurality of engaging holes 151 to be engaged with the radiating antenna 150.

In one embodiment of the present invention, each of the buckles 133 may be composed of two baths disposed at an interval and in mirror symmetry.

Figure 7:
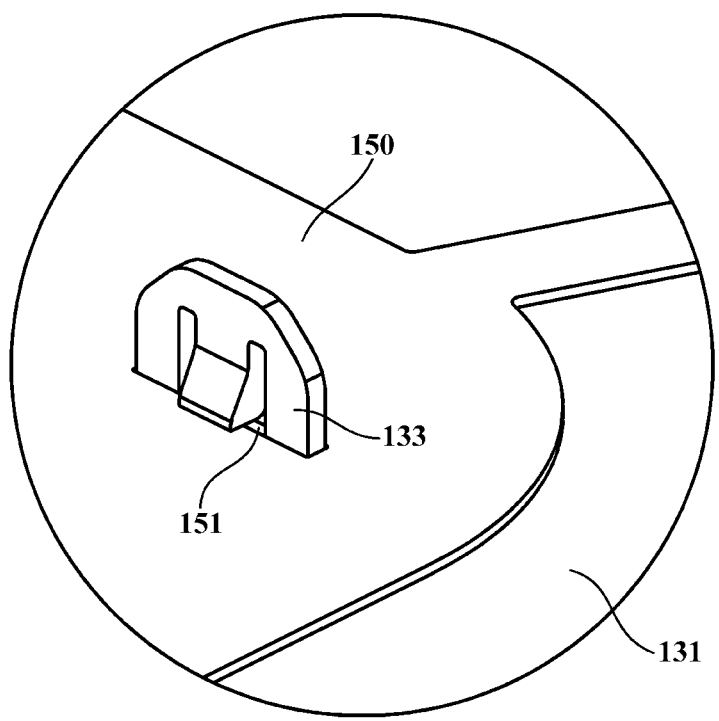
FIG. 7 is a schematic enlarged view of a region C in FIG. 6.

FIG. 7 is a schematic enlarged view of a region C in FIG. 6. Referring to FIG. 7, in another embodiment of the present invention, each of the buckles 133 may be composed of a fixing part perpendicular to the radiating antenna 150 and having a hollow middle part, and an elastic part extending inclining to the fixing part from the inner end edge of the fixing part and toward the antenna.

In some other embodiments, the radiating antenna 150 may be configured to be fixed to the antenna housing 130 through an electroplating process.

The antenna housing 130 may further include a plurality of reinforcing ribs, and the reinforcing ribs are configured to connect the clapboard 131 and the skirt part 132 so as to improve the structural strength of the antenna housing 130.

In some embodiments, the antenna housing 130 may be disposed at the bottom of the cylinder body 110 to avoid the damage to the antenna housing 130 due to the fact that a user places an object to be processed with excessive height. The radiating antenna 150 may be horizontally fixed on the lower surface of the clapboard 131.

The radiating antenna 150 may be disposed at the height of ⅓ to ½, such as ⅓, ⅖ or ½, of the cylinder body 110, so that the volume of the heating chamber 111 is relatively large, and meanwhile, the electromagnetic waves in the heating chamber 111 have a relatively high energy density so as to make the object to be processed heated quickly.

Figure 3:
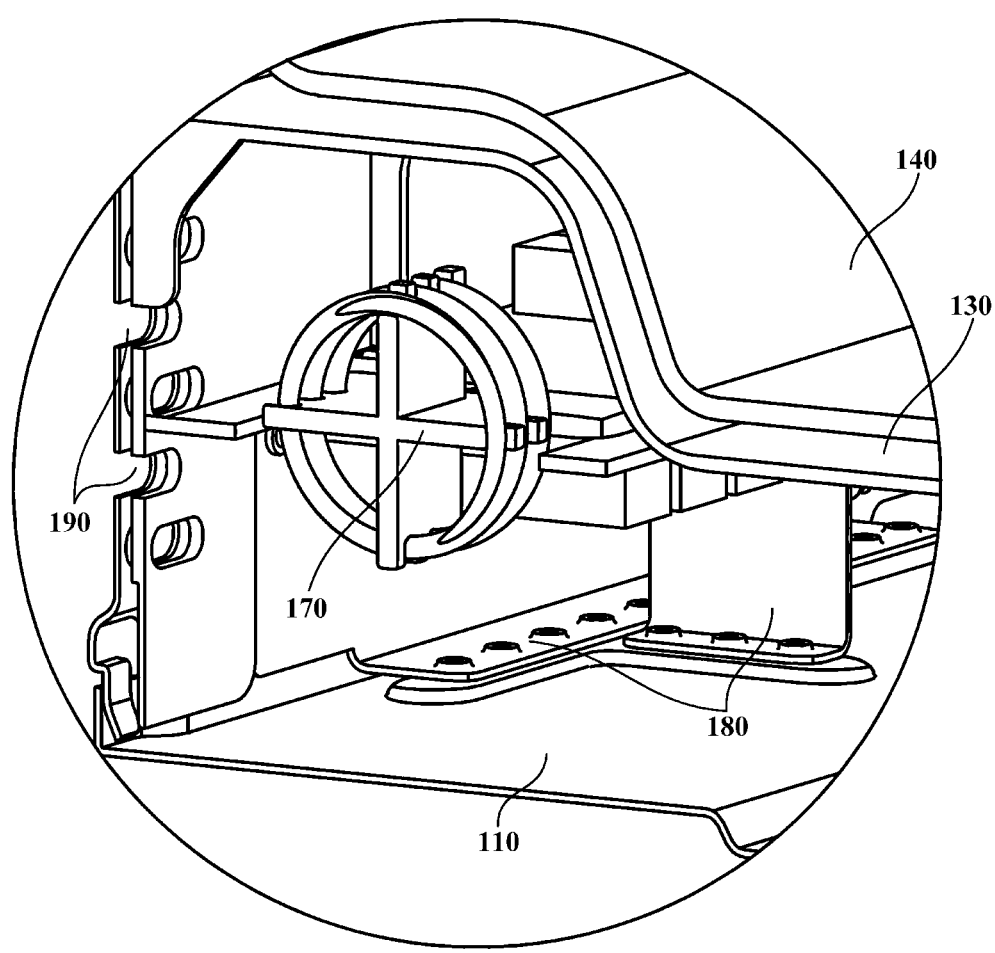
FIG. 3 is a schematic enlarged view of a region A in FIG. 2.

FIG. 3 is a schematic enlarged view of a region A in FIG. 2. Referring to FIG. 1 to FIG. 3, the heating device 100 may further include a signal processing and measurement and control circuit 170. Specifically, the signal processing and measurement and control circuit 170 may include a detection unit 171, a control unit 172 and a matching unit 173.

The detection unit 171 may be connected in series between the electromagnetic generating module 161 and the radiating antenna 150, and is configured to detect in real time the specific parameters of incident wave signals and reflected wave signals passing through the detection unit.

The control unit 172 may be configured to acquire the specific parameters from the detection unit 171, and calculate the power of incident waves and reflected waves according to the specific parameters. In the present invention, the specific parameters may be voltage values and/or current values. Alternatively, the detection unit 171 may be a power meter to directly measure the power of incident waves and reflected waves.

The control unit 172 may further calculate an electromagnetic wave absorption rate of the object to be processed according to the power of incident waves and reflected waves, compare the electromagnetic wave absorption rate with a preset absorption threshold, and send an adjusting command to the matching unit 173 when the electromagnetic wave absorption rate is less than the preset absorption threshold. The preset absorption threshold may be 60% to 80%, such as 60%, 70% or 80%.

The matching unit 173 may be connected in series between the electromagnetic generating module 161 and the radiating antenna 150, and is configured to adjust a load impedance of the electromagnetic generating module 161 according to an adjusting command of the control unit 172, so as to improve the matching degree between the output impedance and the load impedance of the electromagnetic generating module 161, so that when foods with different fixed attributes (such as type, weight and volume) are placed in the heating chamber 111, or during the temperature change of the foods, relatively more electromagnetic wave energy is radiated in the heating chamber 111, thereby increasing the heating rate.

In some embodiments, the heating device 100 may be used for thawing. The control unit 172 may also be configured to calculate an imaginary part change rate of a dielectric coefficient of the object to be processed according to the power of incident waves and reflected waves, compare the imaginary part change rate with a preset change threshold, and send a stop command to the electromagnetic generating module 161 when the imaginary part change rate of the dielectric coefficient of the object to be processed is greater than or equal to the preset change threshold, so that the electromagnetic generating module 161 stops working, and the thawing program is terminated.

The preset change threshold may be obtained by testing the imaginary part change rate of the dielectric coefficient of foods with different fixed attributes at −3° C. to 0° C., so that the foods have good shear strength. For example, when the object to be processed is raw beef, the preset change threshold may be set to 2.

The control unit 172 may also be configured to receive a user command and control the electromagnetic generating module 161 to start working according to the user command, wherein the control unit 172 is configured to be electrically connected with the power supply module 162 to obtain electric energy from the power supply module 162 and is always in a standby state.

In some embodiments, the signal processing and measurement and control circuit 170 may be integrated on a circuit board and horizontally disposed in the electrical appliance chamber 112 to facilitate the electrical connection between the radiating antenna 150 and the matching module.

The antenna housing 130 and the cylinder body 110 may be provided with heat dissipation holes 190 respectively in positions corresponding to the matching unit 173, so that the heat generated by the matching unit 173 during working is discharged through the heat dissipation holes 190. In some embodiments, the signal processing and measurement and control circuit 170 may be disposed on the rear side of the radiating antenna 150. The heat dissipation holes 190 may be formed in the rear walls of the antenna housing 130 and the cylinder body 110.

In some embodiments, the metal cylinder body 110 may be configured to be grounded to discharge the electric charges thereon, thereby improving the safety of the heating device 100.

The heating device 100 may further include a metal bracket 180. The metal bracket 180 may be configured to connect the circuit board and the cylinder body 110 to support the circuit board and discharge the electric charges on the circuit board through the cylinder body 110. In some embodiments, the metal bracket 180 may be composed of two parts perpendicular to each other.

In some embodiments, the electromagnetic generating module 161 and the power supply module 162 may be disposed on the outer side of the cylinder body 110. A part of the metal bracket 180 may be disposed at the rear part of the circuit board and extend vertically along a lateral direction, and may be provided with two wiring ports, so that the wiring terminal of the detection unit 171 (or the matching unit 173) extends out from one wiring port and is electrically connected with the electromagnetic generating module 161; and the wiring terminal of the control unit 172 extends out from the other wiring port and is electrically connected with the electromagnetic generating module 161 and the power supply module 162.

In some embodiments, the heating device 100 may be disposed in a storage compartment of a refrigerator to facilitate users thawing the food.

Hereto, those skilled in the art should realize that although multiple exemplary embodiments of the present invention have been shown and described in detail herein, without departing from the spirit and scope of the present invention, many other variations or modifications that conform to the principles of the present invention may still be directly determined or deduced from the contents disclosed in the present invention. Therefore, the scope of the present invention should be understood and recognized as covering all these other variations or modifications.

The invention claimed is:

1. A heating device, comprising:
   a metal cylinder body, provided with a pick-and-place opening;
   a door body, disposed at the pick-and-place opening and configured to open and close the pick-and-place opening;
   an electromagnetic generating module, configured to generate an electromagnetic wave signal; and
   a radiating antenna, configured to be electrically connected with the electromagnetic generating module to generate electromagnetic waves of a corresponding frequency according to the electromagnetic wave signal, wherein the heating device further comprises:
   an antenna housing, made of an insulating material and configured to separate an inner space of the cylinder body into a heating chamber and an electrical appliance chamber, wherein an object to be processed and the radiating antenna are respectively disposed in the heating chamber and the electrical appliance chamber; and
   the radiating antenna is configured to be fixedly connected with the antenna housing.

2. The heating device according to claim 1, wherein the antenna housing comprises:
   a clapboard, configured to separate the heating chamber and the electrical appliance chamber; and
   a skirt part, configured to be fixedly connected with an inner wall of the cylinder body.

3. The heating device according to claim 2, wherein the antenna housing is disposed at a bottom of the cylinder body, and the radiating antenna is horizontally fixed on a lower surface of the clapboard.

4. The heating device according to claim 3, wherein the radiating antenna is disposed at a height of ⅓ to ½ of the cylinder body.

5. The heating device according to claim 3, further comprising:
   a signal processing and measurement and control circuit, disposed in the electrical appliance chamber and located on a rear side or the radiating antenna, comprising:
   a detection unit, connected in series between the electromagnetic generating module and the radiating antenna, and configured to detect specific parameters of an incident wave signal and a reflected wave signal passing through the detection unit;
   a control unit, configured to calculate an electromagnetic wave absorption rate of the object to be processed according to the specific parameters; and
   a matching unit, connected in series between the electromagnetic generating module and the radiating antenna, and configured to adjust a load impedance of the electromagnetic generating module according to the electromagnetic wave absorption rate.

6. The heating device according to claim 5, wherein the signal processing and measurement and control circuit is integrated on a circuit board, and the circuit board is horizontally disposed.

7. The heating device according to claim 1, wherein the radiating antenna is configured to be engaged with the antenna housing.

8. The heating device according to claim 7, wherein
   the radiating antenna is provided with a plurality of engaging holes; and
   the antenna housing is correspondingly provided with a plurality of buckles, and the plurality of buckles are configured to respectively pass through the plurality of engaging holes to be engaged with the radiating antenna, wherein
   each of the buckles is composed of two barbs disposed at an interval and in mirror symmetry; or
   each of the buckles is composed of a fixing part perpendicular to the radiating antenna and having a hollow middle part, and an elastic part extending inclining to the fixing part from an inner end edge of the fixing part and toward the radiating antenna.

9. The heating device according to claim 1, wherein the radiating antenna is configured to be fixed to the antenna housing by an electroplating process.

10. The heating device according to claim 1, wherein the antenna housing is made of a non-transparent material.

* * * * *